United States Patent Office

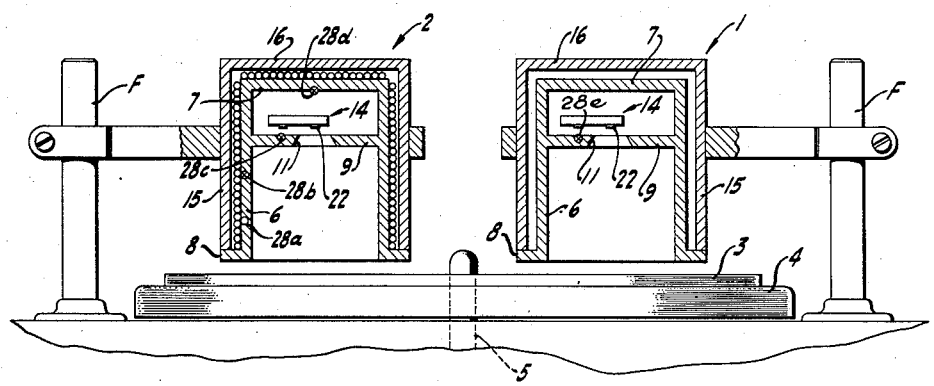
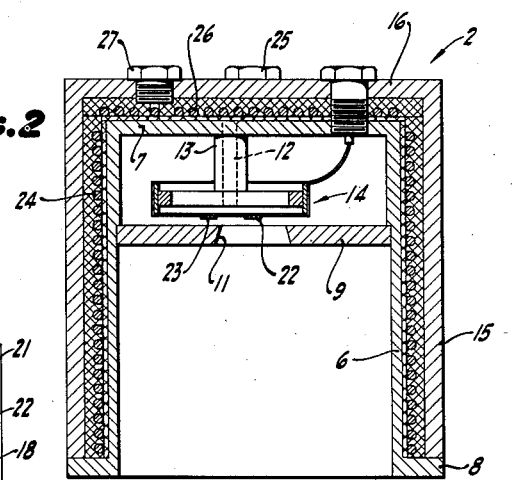
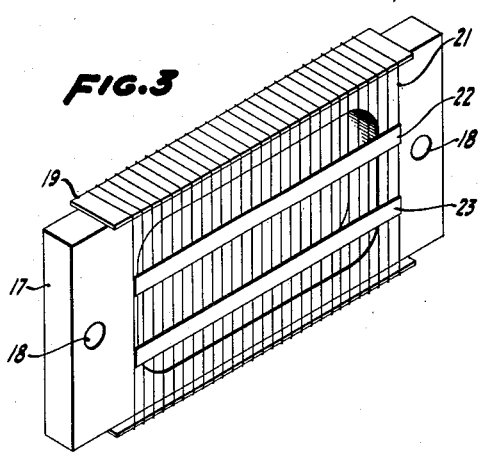

2,707,881
Patented May 10, 1955

2,707,881

DOUBLE BARREL RADIOMETER

Joseph T. Gier, Oakland, Robert V. Dunkle, Concord, and Frederick A. Brooks, Davis, Calif., assignors to The Regents of The University of California, Berkeley, Calif.

Application July 21, 1951, Serial No. 237,996

3 Claims. (Cl. 73—355)

This invention relates to and in general has for its object the provision of a radiometer system for determining simultaneously the emissivity and temperature of a test surface.

More specifically, it is the object of this invention to provide a system of the character above referred to wherein a pair of thermopile radiometers are mounted adjacent each other and adjacent to a table on which the surface to be tested is supported, provision being made for effecting a relative movement between the table and the two radiometers so that each of the radiometers can successively scan the test surface under substantially identical conditions. Provision is also made for maintaining the temperature of one of the radiometers at about 30° F. above the ambient temperature and the temperature of the other radiometer at the ambient temperature. The rate at which the test surface emits thermal radiation is a function of the test surface temperature and emissivity and the net exchange of radiation between the test surface and each radiometer is a function of the test surface temperature, test surface emissivity and the radiometer temperatures. The temperatures of the two radiometers and the net radiation exchange between them and the test surface can then be used in simultaneous equations for determining the temperature and emissivity of the test surface. In this connection it is assumed that the emissivity is a "mean effective emissivity" and that the temperature difference between the two radiometers and the test surface is small so that the energy distribution curves plotted as a function of wave length are nearly the same.

The invention possesses other advantageous features, some of which, with the foregoing, will be set forth at length in the following description where that form of the invention which has been selected for illustration in the drawings accompanying and forming a part of the specification is outlined in full.

In said drawings, one form of the invention is shown, but it is to be understood that it is not limited to such form, since the invention as set forth in the claims may be embodied in other forms.

Fig. 1 is a vertical mid-section of a radiometer system diagrammatically embodying the objects of our invention.

Fig. 2 is an enlarged mid-section of the left-hand side of the radiometer illustrated in Fig. 1.

Fig. 3 is an isometric view of one of the thermopiles used in the radiometer system illustrated in Figs. 1 and 2.

As diagrammatically illustrated in these figures, our radiometer system comprises a pair of radiometer units generally designated by the reference numerals 1 and 2, mounted on a frame F and closely overlying a test surface 3 here shown as supported on a table 4. To enable the radiometer units 1 and 2 successively to scan identical portions of the test surface 3, means is provided for effecting relative rotation between the table and the radiometer units and to this end the table 4 in this instance is mounted on a motor driven spindle 5. However, it is to be observed that for testing fixed surfaces the radiometer units can be mounted for rotation on a portable frame so that they can be placed over the fixed surface to be tested.

Each of the radiometer units 1 and 2 includes an inner cylindrical copper shell 6 having a closed upper end 7 and an open lower end provided with an outwardly extending annular flange 8. Extending across each of the shells 6 intermediate its ends and formed integral therewith is a transverse wall or baffle plate 9 formed with a downwardly diverging central slot or window 11. Suspended from the closed upper end 7 of each of the shells 6 by screws 12 and spacing bushings 13 is a thermopile generally designated by the reference numeral 14. As shown in Figures 1 and 2, the thermopiles 14 are mounted immediately above and in parallelism with the transverse walls 9. Circumscribing each of the inner shells 6 is an outer cylindrical copper shell 15 having a closed upper end 16, the lower open end of each of the outer shells being seated on the flange 8 of its associated inner shell.

Each of the thermopiles 14 includes a rectangular copper frame 17 formed on its ends with holes 18 for the reception of the screws 12. Secured over each of the side edges of each frame 17 is an insulating strip 19. Wound around each of the spools so formed is a section 21 of 42 gauge constantan wire. Mounted over the lower face of the wire winding are a pair of parallel, laterally spaced strips 22 and 23 of lamp-blacked aluminum foil. As shown in Figs. 1 and 2, the right-hand strip 22 of each unit serves as a receiver strip and is therefore positioned in vertical registration with the underlying window 11. The other strip 23 of each unit is shielded by the underlying wall 9. As indicated in Fig. 1, that portion of each turn of wire lying between the receiving strips 22 and 23 on the lower side of each thermopile is silver plated so as to form a series of bimetallic junctions directly beneath each of the receiver strips.

Wound about the peripheral wall of inner shell 6 of the radiometer unit 1 and insulated from both shells 6 and 15 is a coil 24 of 30 gauge constantan wire serving as an electrical heating element and having its terminals connected with jack socket 25. Disposed between the ends 7 and 16 of the shells forming the radiometer unit 2 and insulated therefrom is a second electrical heating element 26 having its ends connected with a jack socket 27. Mounted within the radiometer unit 2 are four thermocouples 28a, 28b, 28c and 28d, each arranged to be connected to its own temperature calibrated potentiometer or millivoltmeter (not shown) for determining the radiometer temperatures at these points. The heating elements 24 and 26 can each be connected with a source of electric current through a suitable rheostat for controlling the temperature within the radiometer. In actual practice it has been found that the temperature variation between the four thermocouples is about 0.2° F. when the radiometer is heated 30° F. above room temperature.

The radiometer unit 1 is unheated and provided with only a single thermocouple 28e located as shown directly beneath the shielded receiver 23. This thermocouple 28e is arranged to be connected with a suitable temperature calibrated potentiometer or millivoltmeter (not shown) by which the ambient temperature within the unit 2 can be ascertained.

Prior to use, both radiometer units should of course be calibrated and calibration constants obtained for each of them. Likewise the various temperature thermocouples should be calibrated.

*Equations for calculating emissivity and surface temperature*

To derive simple usable equations for the radiometers, it is necessary to postulate the following ideal system. The radiometer acts as an ideal radiator, irradiating the surface with an intensity of $\sigma T_1^4$ B. t. u./(sq. ft.)(hr.) for radiometer #1, the unheated radiometer. The thermopile receiver strip is also subjected to this radiation from all directions except the radiometer opening. The shape factor of this opening with respect to the receiver strip is $F=0.165$ for the particular radiometers used. The reference strip receives energy by radiation only from the radiometer housing. The reading of the radiometer is then due to the difference in irradiation of the two strips. The receiver strip is nearly at the temperature of the housing, and due to its small shape factor with respect to the test surface, does not appreciably affect the irradiation of the sample.

The net radiation balance for radiometer No. 1 is: the net rate of heat absorption per unit area of the receiver strip from the radiometer opening is equal to the sum of the energy reflected and radiated from the sample less the energy re-radiated from the receiver strip to the test surface 3. Higher orders of reflection can be neglected, and the reflectivity of the surface is taken as one minus the emissivity.

$$\frac{q}{A} = e_1 \sigma F(1-e_s) T_1^4 + e_1 e_s \sigma F T_s^4 - e_1 \sigma F T_1^4 \quad (1)$$

The radiometer constant is defined by the equation:

$$\frac{q}{e_1 A} = K_1 V_1 = G_r - \sigma F T_1^4 \quad (2)$$

where:

$\frac{q}{A}$ = net rate of heat absorption per unit area of the receiver strip by radiation through radiometer opening
$e_1$ = emissivity of the thermopile
$\sigma$ = Planckian constant
$F$ = shape factor (energy leaving thermopile incident on surface)
$G_r$ = irradiation of receiver strip, B. t. u./hr. ft.$^2$
$e_s$ = emissivity of surface
$T_s$ = temperature of surface
$T_1$ = thermopile and radiometer wall temperature
$K_1$ = calibration constant for radiometer #1 in $$\frac{B. t. u.}{(hr.)(ft.^2)(mv.)}$$

$V_1$ = electromotive force from thermopile in millivolts

From (1) and (2) upon reduction, the following equation is obtained:

$$K_1 V_1 = \sigma F e_s (T_s^4 - T_1^4) \quad (3)$$

Likewise for the heated radiometer, the equation is:

$$K_2 V_2 = \sigma F e_s (T_s^4 - T_2^4) \quad (4)$$

where $K_2$, $V_2$, $T_2$ refer to radiometer No. 2. Solving Equations 3 and 4 simultaneously, one obtains the equations for the emissivity and temperature of the test surface:

$$e_s = \frac{K_1 V_1 - K_2 V_2}{\sigma F(T_2^4 - T_1^4)} \quad (5)$$

and $$T_s = \left( \frac{K_1 V_1 T_2^4 - K_2 V_2 T_1^4}{K_1 V_1 - K_2 V_2} \right)^{\frac{1}{4}} \quad (6)$$

These equations can be directly utilized to solve for the temperature and emissivity of a sample or test surface, or they can be simplified first.

*Nomenclature*

$q$ = heat flow, B. t. u./hr.
$A$ = surface area, ft.$^2$
$e_1$, $e_2$ = emissivities of thermopile receivers.
$\sigma$ = Stefan-Boltzmann radiation constant, $1.72 \times 10^{-9}$, $$\frac{B. t. u.}{(Hr.)(ft.^2)(°R^4)}$$

$F$ = shape factor of the front opening of the radiometer with respect to the receiver strip, i. e., the ratio of the radiant energy leaving the receiver strip which goes out the front opening to the total radiant energy leaving the receiver strip going to one-half space (see Reference 2)
$G_r$ = irradiation of receiver strip, B. t. u./hr. ft.$^2$
$e_s$ = the emissivity of the test surface
$T_1$, $T_2$ = thermopile and radiometer wall temperatures, ° Rankine (°F.+460)
$T_s$ = test surface temperature, ° R (Rankine)
$K_1$, $K_2$ = calibration constants for radiometers, $$\frac{B. t. u.}{Hr. ft.^2 mv.}$$

$V_1$, $V_2$ = electromotive forces generated by the thermopiles, millivolts (mv.)
Subscripts 1 and 2 refer to the unheated and heated radiometers, respectively.

With the two radiometer system as above described, the emissivity of surface at room temperature can be obtained without direct measurement of the surface temperature and without heating the sample or test surface. By mounting the radiometers very close to the test surface so that this surface is irradiated only by energy from the radiometers, the radiation from other sources can be eliminated. The interior of each radiometer housing should be coated with carbon black so as to have a high emissivity so that the irradiation of the sample or test surface approaches ideal black body radiation at the temperature of the radiometer housing. It can be appreciated that if the temperature of a radiometer unit is different from the test surface temperature, which of course is necessary if a reading is to be obtained, the temperature of the test surface will tend to change due to a heat exchange with the radiometer. It is for this reason that the system should be so arranged that both radiometers see the same surface in rapid succession. As already set forth, this can be done by either rotating the test surface in front of the two radiometers or by rotating the two radiometers bodily about a common axis over the test surface.

Furthermore, it has been found that a two radiometer system of this character is sensitive to drafts and consequently should be used in a quiet room where the temperature changes are small.

We claim:

1. A radiometer system comprising: a base; a test surface supporting member mounted on said base; a pair of radiometers mounted on said base adjacent each other and directed toward said supporting member; means for effecting relative movement between said pair of radiometers as a unit and said supporting member so that said radiometers will successively scan identical portions of said test surface, each of said radiometers being formed with a window facing said supporting member and each including a thermopile having a set of junctions in line with its associated window and its other set of junctions shielded from said window; means for maintaining a differential temperature between said radiometers; and means within each of said radiometers for sensing the temperature therein.

2. A radiometer system comprising: a base member; an endless conveyor mounted on said base for supporting a surface to be tested; first and second radiometers mounted on said base in spaced relation to each other and directed toward said endless conveyor so as successively to scan identical portions of said test surface, each of said radiometers being formed with a downwardly facing window and each including a thermopile having one set of junctions above and in line with its associated window and its other set of junctions shielded from said window; means for maintaining a differential temperature between said radiometers; and means within each of said radiometers for sensing the respective temperatures therein.

3. A radiometer system comprising: a base member; a rotary table mounted on said base for supporting a surface to be tested; first and second radiometers mounted on said base in spaced relation to each other and overlying said rotary table, each of said radiometers being formed with a downwardly facing window and each including a thermopile having one set of junctions above and in line with its associated window and its other set of junctions shielded from said window; means for maintaining a differential temperature between said radiometers; and means within each of said radiometers for sensing the respective temperatures therein.

References Cited in the file of this patent
UNITED STATES PATENTS

| | | |
|---|---|---|
| 2,528,626 | Wannamaker, Jr. et al. | Nov. 7, 1950 |
| 2,565,249 | Machler | Aug. 21, 1951 |